Dec. 6, 1960  A. W. HUGHES  2,963,062
DEVICE FOR CUTTING MEAT INTO SMALL CHUNKS
FOR GRINDING OR OTHER PROCESSING
Filed May 21, 1959  2 Sheets-Sheet 1
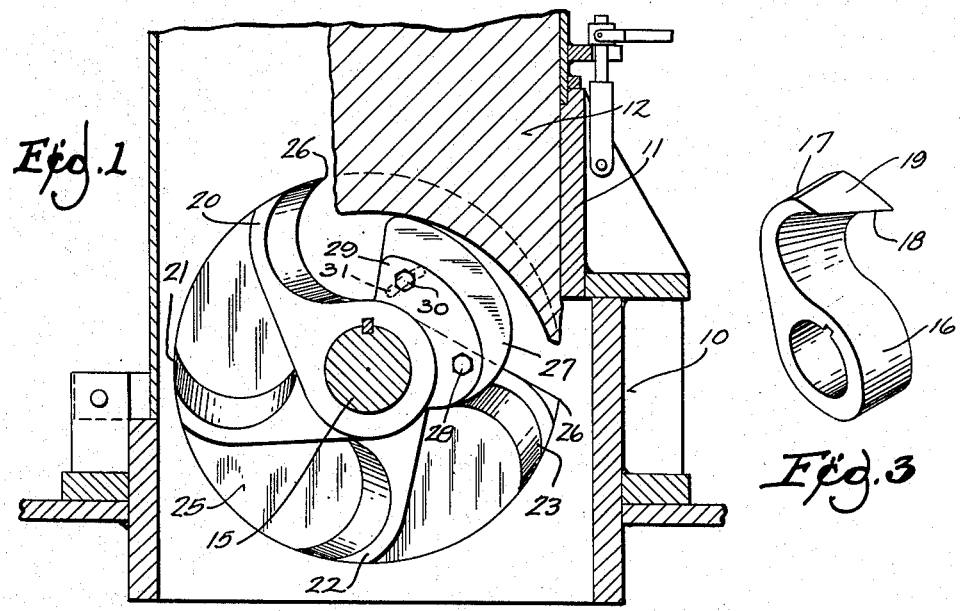
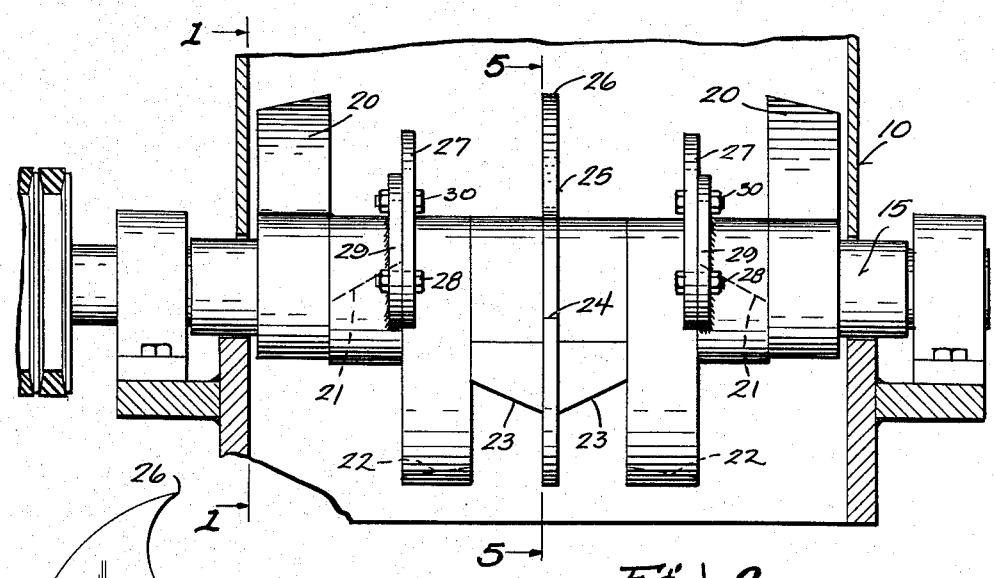
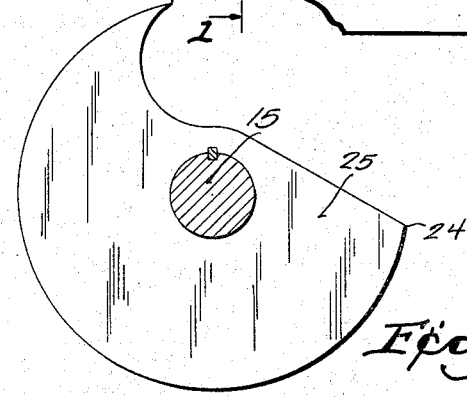
INVENTOR.
ALVIN W. HUGHES
BY
Wheeler, Wheeler & Wheeler
ATTORNEYS Dec. 6, 1960         A. W. HUGHES         2,963,062
DEVICE FOR CUTTING MEAT INTO SMALL CHUNKS
FOR GRINDING OR OTHER PROCESSING
Filed May 21, 1959                        2 Sheets-Sheet 2

INVENTOR.
ALVIN W. HUGHES
BY
Wheeler, Wheeler & Wheeler
ATTORNEYS

United States Patent Office 2,963,062
Patented Dec. 6, 1960

2,963,062

DEVICE FOR CUTTING MEAT INTO SMALL CHUNKS FOR GRINDING OR OTHER PROCESSING

Alvin W. Hughes, 4N194 Church Road, Bensenville, Ill.

Filed May 21, 1959, Ser. No. 814,822

4 Claims. (Cl. 146—123)

This invention relates to a device for cutting meat hardened by freezing, or other similar products, into small chunks for grinding or other processing.

The device of the present invention will cut chunks of frozen meat of any desired size from a large block. A rotor includes a series of forwardly directed teeth mounted on a central arbor for rotation beneath a block of meat which is fed by gravity to the rotor. The teeth desirably are arranged in pairs to operate in different zones axially of the arbor or shaft. Since each tooth or pair of teeth operates in a different zone, the operation of the several teeth being successive, the load on the machine is equalized over a substantial period of its rotation and at the conclusion of each cycle of equalized operation, the block of meat drops for a predeterminable extent to position additional surfaces in the path of the successively operating teeth.

As each tooth enters the meat, the weight of the block is supported by the end of the tooth while its leading edge is cutting away a chunk from the block. To continue the support of the block until the next tooth or pair of teeth takes over such support, it is possible to provide the respective teeth with trailing tail pieces at uniform radius or, alternatively, to provide a separate supporting disc which, like the teeth, is discontinuous at the point when it is desired that the block be advanced for a new series of chunk severing operations.

In both embodiments, adjustable means is provided to receive the weight of the advancing block following one cycle of operations and to limit block advance to a desired level which will determine the depth of the cut made in each successive cycle of tooth operations upon the block.

In the drawings:

Fig. 1 is a view showing apparatus embodying the invention as it appears in section taken on line 1—1 of Fig. 2.

Fig. 2 is a view of the apparatus showing the rotor in front elevation, the housing being shown in axial section.

Fig. 3 is a detail view in perspective of a single tooth.

Fig. 4 is a detail view in side elevation showing the central disc, which also includes a cutting edge.

The housing 10 may be of any desired construction but preferably has a surface at 11 against which the meat block 12 is forced by the rotating cutting head, the surface 11 extending into close proximity to the path of movement of the cutting teeth.

Figure 9:
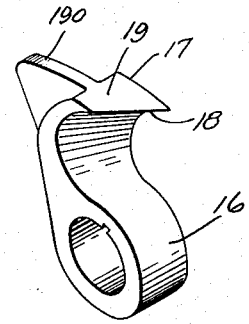
Fig. 9 is a view similar to Fig. 3 showing in perspective the modified form of tooth used in Figs. 7 and 8.

The shaft or arbor 15 extends transversely of the housing 10 to support the cutting head, which comprises a series of forwardly projecting teeth desirably, though not necessarily, in pairs. The typical tooth shown in Fig. 3 comprises a hub 16 provided with a key way for connection to the arbor 15. From it the tooth 17 extends radially outwardly and has a forwardly directed cutting edge 18 and a work supporting surface 19 of generally uniform radius. Fig. 9 shows how the work supporting surface 19 can be extended rearwardly at 190 if desired.

The set of teeth comprising the cutting head desirably includes at least one and preferably two terminal teeth 20; at least one, and preferably two, second operating teeth 21; at least one, and preferably two, third operating teeth 22; and at least one, and preferably two, fourth operating teeth 23. Assuming that the teeth are in pairs, in accordance with the preferred practice, the two teeth 20 are at the ends of the series, the two teeth 21 are next in position inwardly from teeth 20, the two teeth 22 are next inwardly from teeth 21, and the two teeth 23 are close to each other at the center of the cutting head, being spaced, desirably, by a supporting and centering disc 25 which desirably has a tooth of its own at 26. This disc is separately illustrated in Fig. 4. Angularly its tooth may register with the teeth 20, but it will be observed that the successive teeth 20, 21, 22 and 23 are all progressively offset angularly as well as axially offset.

The angular offset of successive pairs of teeth is not so great but that the weight of the meat block 12 will be transferred from the outer periphery of one tooth to the outer periphery of the next until the end of the series is reached. At that time the block of meat will drop following the passage of the teeth 23 and the terminal shoulder 24 of the guiding disc 25. The extent of drop will be determined by one or more adjustable gauge members 27 which may be pivotally connected by the bolts 28 adjacent their leading ends to flanges 29 which may be fixed to the hubs of any one of the intermediate teeth. The trailing ends of the gauge members 27 are adjustably clamped by bolts 30 to the flanges 29, there being slots 31 to accommodate an in and out adjustment of the trailing ends of the gauge members 27 to determine the depth to which the block of meat 12 will be permitted to fall with respect to the paths which will be followed by the several teeth during continued rotation of the cutting head.

Figure 5:
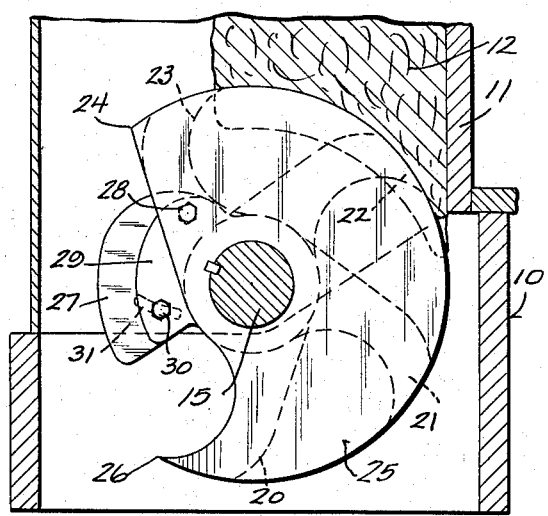
Fig. 5 is a view taken in section through the apparatus on the line 5—5 of Fig. 2.
Figure 6:
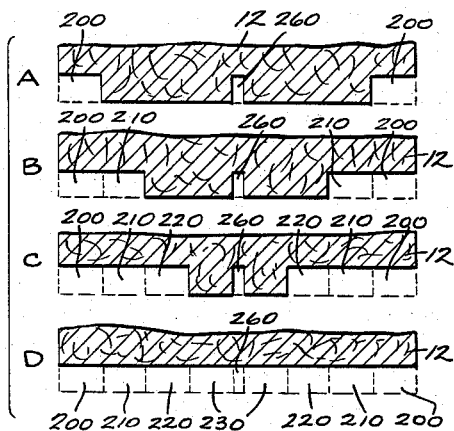
Fig. 6 is a diagrammatic developed view showing the effect of the successive operations of paired teeth in each successive cycle.

Fig. 6 diagrammatically illustrates the effect of the teeth. The meat block is shown at 12. In the first view, identified by reference character A, the passage of teeth 20 has removed chunks of meat from the block, leaving corner channels at 200. The tooth 26 of disc 25 has cut a narrow central channel at 260.

In the view identified by reference character B, the teeth 21 have removed additional chunks from the block in the zones indicated at 210. In the view identified by reference character C, additional chunks have been removed by the teeth 22 from the zones indicated by reference character 220. In the final view, identified by reference character D, the teeth 23 have removed the last chunks of meat from the zones indicated at 230. All of the chunks removed are of uniform thickness, since all of the teeth operate at the same radius. The thickness is determined by the setting of the respective gauge members 27, to which the block of meat will now fall as soon as support of teeth 23 and disc 25 is removed by the continued rotation of the cutter head. The cycle of operations will now be repeated to cut additional chunks from the next zone or level of the block 12.

Figure 7:
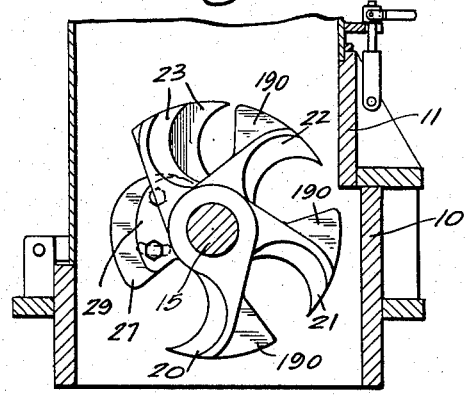
Fig. 7 is a view on a reduced scale which is similar to Fig. 1 but shows a modified embodiment of the apparatus.
Figure 8:
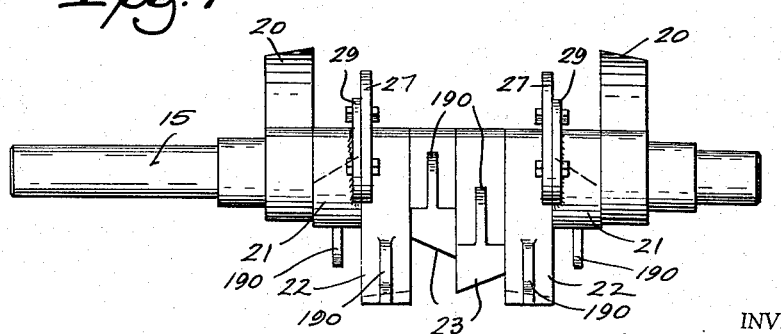
Fig. 8 is a view similar to Fig. 2 showing the modified embodiment of Fig. 7 but without the housing illustrated in Fig. 2.

As already indicated, the support for the block during the cycle is provided by the end surfaces of the respective teeth plus the periphery of the disc 25, all being at constant radius outwardly of the radius represented by the gauge members 27. However, for certain purposes, it may be desirable not to use the disc 25. In that event the peripheral extent of the several teeth is desirably extended by trailing flanges 190 such as that indicated at 19 in Figs. 7, 8 and 9.

In either arrangement, the block will be supported at a given level until progressive cuts have been made all the way across its lower end, whereupon the block will fall to a new level at which the sequence of cuts will be repeated.

I claim:

1. A cutting head for use in a device of the character described, said cutting head comprising an arbor, hubs mounted thereon, teeth projecting radially from said hubs and having cutting edges projecting forwardly in the direction of arbor rotation, the several teeth being adapted to operate on different laterally adjacent portions of the work and having work supporting radially outward terminal portions, successive teeth on hubs spaced axially of the arbor being also angularly offset from each other in a series which is discontinuous about the arbor, whereby work support is terminated at a given point of arbor rotation, said arbor further being provided with means of radially less extent than said teeth for receiving the work when the series of teeth is discontinued in the rotation of the arbor, whereby to determine the depth at which successive teeth will engage the work in the next series of cuts.

2. The device of claim 1 in which the teeth are arranged in pairs, the teeth of respective pairs being substantially like distances from the ends of the arbor.

3. The device of claim 2 in which said arbor is provided with a disc having certain of said teeth at each side thereof, and having a forwardly directed cutting tooth of its own, said disc being of approximately uniform radius behind its said tooth.

4. The device of claim 2 in which the individual teeth are provided with trailing flanges of substantially uniform radius for providing work support which is substantially continuous until the weight of the work is transferred from one pair of said teeth to the next to the end of said series of teeth.

References Cited in the file of this patent

UNITED STATES PATENTS

| | | |
|---|---|---|
| 2,440,051 | Lind et al. | Apr. 20, 1948 |
| 2,614,597 | Magnus | Oct. 21, 1952 |
| 2,655,213 | Anderson | Oct. 13, 1953 |